United States Patent Office 3,378,334
Patented Apr. 16, 1968

3,378,334
OXIDATION OF WASTE GASES IN THE
PRESENCE OF MIXED CATALYSTS
Herman S. Bloch, Skokie, Ill., assignor to Universal Oil
Products Company, Des Plaines, Ill., a corporation of
Delaware
No Drawing. Continuation-in-part of application Ser. No.
75,666, Dec. 14, 1960. This application May 21, 1964,
Ser. No. 369,279
5 Claims. (Cl. 23—2)

ABSTRACT OF THE DISCLOSURE

Catalytic oxidation of combustible gases by contacting said gases, in admixture with $O_2$, with a fixed bed of spherical platinum catalyst particles, about 8–30% of the particles being of high Pt content (up to about 5% Pt) and the remainder being of lower Pt content, the high platinum particles being uniformly distributed throughout the volume of the catalyst bed and the overall Pt content of the catalyst bed being about 0.05–0.2% by weight.

The present invention relates to an improved method for converting and improving waste product streams for discharge to the atmosphere, and more particularly, for converting vehicular exhaust gas streams to less harmful products by subjecting them to contact with a fixed, particle-form bed of catalyst having a novel distribution of activating component therein which achieves maximum effectiveness of the catalyst at minimum cost. This application is a continuation-in-part of my copending application 75,666, filed Dec. 14, 1960.

The desirability and importance of removing certain components from vehicular exhaust gases is recognized. The unavoidably incomplete combustion of hydrocarbon fuels by the internal combustion engine results in the generation of substantial quantities of unburned hydrocarbons and other undesirable products which are released to the atmosphere through the exhaust line. With the ever-increasing number of automobiles, particularly in urban areas, the discharge of deleterious matter into the atmosphere may reach significant proportions. These undesirable products are believed to react with atmospheric oxygen, under the influence of sunlight, to produce what is now commonly referred to as smog. The undesirable combustion products include, for example, unsaturated hydrocarbons, partially oxidized hydrocarbons, such as alcohols, ketones, aldehydes, and acids, etc., carbon monoxide, and various oxides of nitrogen and sulfur.

The discharge of exhaust gases from gasoline engines is only one source of pollution within the atmosphere. Although described with particular reference to the conversion of such exhaust gases, the present invention is equally well suited for use with diesel engines, butane engines, natural gas engines, and the like. Other sources of atmospheric pollution include the waste material from stationary units such as large internal combustion engines for driving pumps, compressors, generators; flue-gas power recovery units; exhaust fumes from various industrial operations such as the printing industry, the tanning industry, and various chemical industries. For example, in the printing industry, inks, dyes, and the like contain hydrocarbons and other chemical compounds, which, either in the same or modified form, accumulate within the surroundings and are vented into the atmosphere, by blowers, fans, etc. In the chemical field, for example, the manufacture of phthalic anhydride by the oxidation of naphthalene frequently results in the emission of noxious gases into the atmosphere. In all such processes emitting waste gases, it is therefore desirable to oxidize the waste gases by catalytic means prior to discharge into the atmosphere, the objective being to convert at least a substantial portion of the unburned hydrocarbons and carbon monoxide into carbon dioxide and water.

While the instant invention has specific utility in connection with the conversion of exhaust gases emanating from an intermittently operated internal combustion engine, it should be understood that it may also be beneficially employed in the conversion of waste gases generally, such as result from the typical industrial processes indicated above.

With regard to automotive and other vehicular applications, the catalyst is usually disposed as a fixed, particle-form bed placed in a suitable container or catalytic converter which is installed in the engine exhaust gas line. The catalytic converter may be of the through-flow, cross-flow or radial-flow design and may supplant or be combined with the normal acoustic muffler. Secondary or combustion air is injected ahead of the converter inlet usually by means of an aspirator or by a suitable engine-driven compressor. The rate of secondary air flow is usually adjusted or maintained to provide from about 10% to about 30% of excess air so as to insure reasonably high conversion levels under all conditions of driving.

An important consideration in formulating an exhaust gas oxidation catalyst for vehicular applications is to attain a relatively low ignition temperature, or threshold activation temperature, so that the conversion reactions are self-sustaining within a minimum time after startup from cold engine conditions and the emission of unconverted gases is thereby held to a minimum. Depending on the makeup of exhaust gases and at specified conditions of combustibles content and percent oxygen, all catalytic compositions are characterized by such ignition temperature, below which there results virtually no conversion of the exhaust gases. After the catalyst bed has been brought up to operating temperature, however, the exothermic oxidation reactions will be self-sustaining even though the temperature of the incoming gases should temporarily fall below the ignition temperature; this hysteresis effect is due in part to the heat capacity of the catalyst bed and in part to the nature of the specific catalytic composition employed. Most of the exothermic heat of reaction is believed due to the oxidation of carbon monoxide to carbon dioxide, as distinguished from the oxidation of hydrocarbons.

Studies of typical urban driving patterns indicate that a large percentage of driving time is spent at engine conditions of idle and cruising speeds under about 30 miles per hour when the exhaust gas temperature is generally below about 400° F.; if the particular catalyst employed under these conditions were to have an ignition temperature above 400° F., then obviously little or no conversion of the exhaust gas could be achieved. Furthermore, a considerable portion of auto commuter traffic consists in short-haul runs beginning with a cold engine; the sensible heat of the exhaust gases during the warm-up period necessarily is used to heat up the exhaust manifold, exhaust pipe, converter and catalyst bed so that a period of from about 5 minutes to an hour or more, as in a severely cold climate, is required before conversion of the exhaust gases commences. All during such warm-up periods, of course, the exhaust gases pass on through the converter essentially unchanged and are thence released to the atmosphere.

Waste gas oxidation catalysts are generally constituted in a manner similar to gasoline reforming catalysts as well as other hydrocarbon conversion catalysts in that they comprise a high surface area refractory inorganic oxide base or support such as alumina, alumina-silica, alumina-zirconia, etc. upon which are deposited, as by precipitation or impregnation techniques, one or more activating components, i.e., catalytically active metals or metal oxides. Particularly desirable activating components for burning combustible gases are the metals of the platinum family, especially platinum and palladium; these show excellent conversion activity for carbon monoxide, hydrocarbons, and oxygenated hydrocarbons over prolonged periods of time. It has been established that the ignition temperature of catalysts in which the activating component comprises a platinum group metal decreases as the weight percentage of platinum group metal present, based on the total composite is increased, up to about 5% by weight; the relationship is somewhat less than linear, perhaps approximating a hyberbolic function so that at concentrations above about 5% by weight, additional amounts of activating component do not appear to effect any appreciable reduction of ignition temperature. One way, therefore, to arrive at a catalyst having a suitably low ignition temperature is to fix the concentration of activating component at a correspondingly high level, say, in the case of platinum, at about 1% by weight, at which level the ignition temperature of the catalyst will be around 350° F. For average exhaust gas streams, however, this approach is unduly expensive. Economic studies have shown that in order to make a packaged catalytic converter complete with catalyst competitively attractive to the mass motorist market, the platinum content of the finished catalyst should not exceed about 0.2% by weight. Furthermore, on account of the aforesaid hysteresis effect, once the catalyst bed has been brought up to operating temperature, very good carbon monoxide and hydrocarbon conversions can be realized under all conditions of engine operation, i.e., whether at idle, accelerate, cruise or decelerate, with platinum contents as low as 0.05%–0.1% by weight based on the finished catalyst; it is clear that under normal "steady-state" conditions, amounts of platinum substantially in excess of this range would be mere surplusage. In fact, extensive tests have demonstrated the operability of catalysts containing as little as 0.01% platinum; however, catalysts containing below about 0.01% platinum show a marked decrease in stability, or ability to sustain high exhaust gas conversions, in the face of contamination by lead and lead compounds which are inevitably present in exhaust gases emanating from internal combustion engines running on gasoline containing tetra-ethyl lead. In view of the foregoing, it is clear that the optimum platinum concentration of a waste gas conversion catalyst employing platinum as the activating component lies within the range of about 0.05% to about 0.2% by weight; however, the ignition temperature of such catalyst is unsatisfactorily high for use with intermittently operated internal combustion engines. A basic shortcoming, then, of platinum catalysts in particular (and of catalysts in which the activating component comprises other metals, in general) is that those containing amounts of activating components small enough to be economically feasible have relatively high ignition temperatures, while those which have satisfactorily low ignition temperatures contain too much activating component to be practical.

The present invention provides an improved waste gas oxidation catalyst for the purposes described comprising a mechanical or physical mixture of at least two portions of catalyst particles, a minor portion containing a relatively high percentage of activating component per particle, and a major portion containing a substantially lesser percentage of activating component per particle, the particles of higher activating component content being distributed substantially uniformly throughout the entire volume of the catalyst bed. The composition is so regulated that the overall activating component content corresponds to no more than is commercially feasible in a uniform bed; where the activating component is platinum, such overall platinum content would then lie within the range of about 0.05% to about 0.2% by weight based on the finished catalyst. Such catalytic composites operate as follows: at the lowest temperatures, the combustion starts on the catalyst particles containing the higher platinum content. These particles generate enough heat to raise the temperature of adjacent particles of lower platinum content which are soon raised to their ignition temperature. The high-platinum particles are uniformly distributed throughout the catalyst bed, whereby the heating-up mechanism takes place by way of many small, spheroidal high temperature zones which are uniformly spaced throughout the volume of the bed and which come into being more or less simultaneously. Thus from a relatively few particles of high platinum content, the resulting ignition chain quickly spreads stepwise throughout the entire catalyst bed, until the entire bed is operative at the higher temperatures necessary for utilization of catalysts containing the lower platinum content. In summary, then, the distribution of platinum is such as to attain maximum effectiveness at minimum cost. This object is realized by uniform dispersal of high activity particles throughout the catalyst bed, each such particle acting as a center of heat generation to spread heat by radiation and conduction to its less active neighbors.

The present invention is to be distinguished from the known concept of employing an active "core" of ignitor catalyst disposed in a main catalyst bed of lower activity. Arrangements of the latter type contain a cluster or lumped mass of high activity particles designed to function as a zone of high heat capacity and persistent heat retentivity with minimum heat loss therefrom, whereby an active ignition source within the catalytic converter is maintained for a considerable time after the engine is turned off. Since a plurality of high activity particles are bunched together, the cold body/hot body contact area ratio is reduced, and a hot particle located centrally within the group can see only other hot particles rather than cold ones. This means that substantially less heat flow can occur and the heat propagation effect is largely wasted. The present invention, on the other hand, by providing uniform distribution of the high activity particles, seeks to maximize heat transfer from each high activity particle to the surrounding low activity particles.

In one embodiment, the present invention provides a method for burning combustibles contained in a waste gas stream which comprises contacting said stream, in admixture with oxygen and at oxidation temperature with a bed of platinum-containing refractory oxide particles of substantially spherical shape and uniform size, about 8% to about 30% of the particles each having a relatively high platinum content not exceeding about 5% by weight of platinum per particle and the major portion of the particles each having a relatively low platinum content not exceeding about 0.1% by weight of platinum per particle, the platinum content of each high platinum particle being at least three times the platinum content of each low platinum particle, said particles of high platinum content being distributed substantially uniformly throughout the entire volume of said bed and said particles of relatively high and low platinum content being proportioned to provide in the bed an overall platinum content in the range of about 0.05% to about 0.2% by weight.

The catalyst particles are desirably substantially spherical and of uniform size to promote uniform distribution of the high platinum particles throughout the catalyst bed, to promote uniform gas flow through the bed, and to facilitate loading and unloading the converter. As distinguished from cylinders, cubes, etc., spheres are the most effective shape for acting as heat sources because in a fixed bed they contact the maximum number of adjacent spherical particles. The spherical particles are preferably about 0.03 inch to about 0.3 inch in diameter, the customary standard sizes within this range being 1/16" and 1/8". Diameters below this range may result in excessive catalyst loss and/or plugging of the catalyst retaining screens within the converter, and diameters above this range may cause channelling, non-uniform space velocities, and poor fluid-solid contact, at least in the case of the 1-pound to 10-pound catalyst loadings commonly employed in automotive exhaust gas converters. In a fixed bed of uniformly sized spherical particles, each sphere touches 12 others; to initiate the chain ignition most effectively in a two-fraction mixture it is necessary that at least one of every thirteen spheres have the higher percentage of activating component, so that at least $\frac{1}{13}$ or about 7.7% of the total number of spherical particles have the higher percentage of activating component. In order to accommodate statistical deviations—since it is impossible to obtain a perfectly uniform mechanical mixture of particles—it is desirable to provide an excess number of particles having the lower ignition temperature, e.g., about 8% to about 30% of the total number. In the event that non-spherical particles such as ellipsoids, cylinders, pellets, etc. are employed, analogous geometrical considerations may be relied upon to calculate the minimum number of low ignition temperature particles required in these cases.

This invention further provides that the high platinum particles have a relatively high platinum content not exceeding about 5% by weight of platinum per particle. Platinum concentrations higher than 5% do not appreciably reduce the ignition temperature. The major portion of spherical particles have a relatively low platinum content not exceeding about 0.1% by weight of platinum per particle. With respect to the relative quantities of platinum as between the high percentage fraction and the low percentage fraction, the platinum content of each high platinum particle is at least three times the platinum content of each low platinum particle. This minimum weight ratio of three is necessary in order that the heating effect arising from a multiplicity of small spheroidal high temperature zones is selfpropagating in minimum time. Furthermore, in accordance with the invention, the number of high platinum particles and low platinum particles and/or platinum contents of the respective fractions are proportioned to provide in the catalyst bed an overall platinum content in the range of about 0.05% to 0.2% by weight.

Examples of suitable two-fraction mixtures of platinum-alumina catalyst particles (mixtures A, B, C, D) are set forth in Table I below.

TABLE I

| Wt. percent of Catalyst | Wt. percent platinum per particle | | | |
|---|---|---|---|---|
| | A | B | C | D |
| 10 | 1.5 | 1 | | |
| 90 | 0.05 | 0.055 | | |
| 25 | | | 0.50 | 0.30 |
| 75 | | | 0.033 | 0.033 |
| Overall Wt. percent Platinum | 0.195 | 0.150 | 0.150 | 0.100 |

As the particles are of substantially uniform size and shape, and weigh approximately the same since the absolute platinum levels and very low even among the high-platinum fractions, the "weight percent of catalyst" figure is substantially equivalent to the percent of total particles embraced by the corresponding fraction.

In further embodiments, the present invention employs mixtures of more than two fractions of varying platinum content; particularly desirable are 3-fraction and 4-fraction mixtures. Such mixtures virtually eliminate any possibility of the chain ignition effect prematurely dying out by reason of isolated regions of non-uniform particle distribution within the catalyst bed. As with the 2-fraction mixtures, about 8% to about 30% of the particles have a relatively high platinum content not exceeding about 5% by weight of platinum per particle, and the majority of particles in the bed each have a relatively low platinum content not exceeding about 0.1% by weight of platinum per particle. The portion of catalyst particles having a relatively high platinum content contain at least three times as much platinum as the portion having a relatively low platinum content on a particle-by-particle basis. The several fractions of higher platinum content are distributed substantially uniformly throughout the bed. Taking as an example a catalyst comprising platinum on an alumina support, a 3-fraction mixture of such catalyst may contain a minor portion containing from about 0.75% to about 5% platinum per particle; an intermediate portion containing from about 0.1% to about 0.75% platinum per particle; and a remaining major portion containing less than 0.1% platinum per particle. The composition is so regulated that the overall platinum content corresponds to no more than is normally used in a uniform bed, i.e., from about 0.05% to about 0.2% platinum by weight. These multi-fraction catalyst mixtures operate as follows; at the lowest temperatures, the combustion starts on the catalyst particles containing the highest platinum content. These particles generate enough heat to raise the temperature of adjacent particles. Since each spherical particle touches 12 others, if one of the 12 touching or one closely adjacent to a high-platinum sphere contains the next-highest platinum content, it is soon raised to its ignition temperature, and soon it in turn starts ignition of adjacent catalyst particles of next lower platinum content, and so on. Thus, from a relatively few particles of highest platinum content the ignition chain quickly propagates throughout the bed, until the entire bed is operative at the higher temperatures necessary for utilization of the low-platinum fractions. Examples of suitable 3-fraction mixture of platinum-alumina catalyst particles (mixtures E, F, G) are set forth in Table II below:

TABLE II

| Wt. percent of Catalyst | Wt. percent platinum per particle | | |
|---|---|---|---|
| | E | F | G |
| 2 | 2 | 1 | 0.75 |
| 20 | 0.25 | 0.20 | 0.23 |
| 78 | 0.013 | 0.051 | 0.05 |
| Overall Wt. percent Platinum | 0.100 | 0.100 | 0.100 |

In the case of a 4-fraction mixture of platinum-alumina catalyst, such mixtures may contain a first minor portion of particles containing from about 0.75% to about 5% platinum per particle; a second portion embracing a greater number of particles than said first portion and containing from about 0.1% to about 0.75% platinum per particle; a third portion embracing a greater number of particles than said second portion and containing from about 0.075% to about 0.1% platinum per particle; and a fourth portion embracing the majority of particles of the bed and containing less than about 0.075% platinum per particle. Examples of suitable 4-fraction mixtures of platinum-alumina catalyst particles (mixtures H, I, J) are set forth in Table III below:

TABLE III

| Wt. percent of Catalyst | Wt. percent platinum per particle | | |
|---|---|---|---|
| | H | I | J |
| 1 | 2 | 1 | 0.75 |
| 7 | 0.3 | 0.5 | 0.5 |
| 28 | 0.1 | 0.08 | 0.09 |
| 64 | 0.05 | 0.05 | 0.05 |
| Overall Wt. Percent Platinum | 0.100 | 0.100 | 0.100 |

The representative examples set forth in Tables I, II and III, supra, are by no means exhaustive and obviously many other combinations are possible.

Although the foregoing discussion has been directed principally to platinum-alumina composites, it should be understood that the basic principle of this invention may be applied to catalysts of other compositions, including those comprising different bases and/or activating components. The various activating components or catalytically active metallic constituents which may be composited with the refractory inorganic oxide carrier material, in addition to or in lieu of platinum-group metals of the Periodic Table, may comprise, for example: vanadium, manganese, chromium, molybdenum, tungsten, members of the iron group, copper, silver and gold. A particular metal may be used in and of itself or in combination with any of the foregoing metals; however, platinum is preferably desired by reason of its ability to provide a sustained high activity for oxidation of carbon monoxide, hydrocarbons, and oxygenated hydrocarbons. Thus, a preferred catalyst to be employed for burning combustibles prior to discharge thereof into the atmosphere may comprise the following: platinum, palladium, other noble metals such as iridium, ruthenium, and rhodium, various mixtures including platinum-iron, platinum-cobalt, platinum-nickel, palladium-iron, palladium-cobalt, palladium-nickel, platinum-palladium, palladium-copper-cobalt, platinum-copper-lithium-cobalt, platinum-cobalt-copper, copper-cobalt-nickel-platinum, platinum-palladium-cobalt, manganese-platinum, platinum-cobalt-manganese, lithium-platinum-cobalt, copper-cobalt-lithium, etc. It is understood that the catalytic activity, thermal stability, lead stability, auto-ignition temperature, and other characteristics of these different catalysts are not necessarily equivalent. Many of the specific catalytic composites discussed herein do not necessarily yield equivalent results when compared with catalysts comprising two or more different metallic components.

In accordance with the present invention, the catalyst utilizes a special refractory inorganic oxide as the carrier material for the activating components hereinabove set forth. Refractory oxides possess particular physical characteristics which readily permit adaptation thereof to the environment encountered in the oxidation of waste gases. For example, one desirable physical characteristic is that extremely high temperatures, such as are sometimes encountered under high speed driving conditions, do not apparently affect the capability of the material to function as desired. The refractory oxide carrier material, for utilization in the instant catalyst, may be manufactured by various suitable methods, including separate, successive, or coprecipitation methods of manufacture.

The preferred refractory oxide support will comprise a major proportion of alumina. The term "alumina" is intended to include porous aluminum oxide in the various states of hydration. The refractory oxide support may be pure alumina or may be a composite thereof incorporating at least one other refractory oxide support in conjunction with the alumina. Specifically, an oxide such as silica, titania, zirconia, hafnia, or a mixture of two or more of such oxides may be incorporated with the alumina. The addition or incorporation of any of these refractory oxides with the alumina is generally dependent upon the desire to add thereto certain physical and/or chemical characteristics. The added oxide, or oxides, may be present within the carrier material in an amount within the range of about 0.1% to about 30.0% by weight thereof. Intermediate quantities are preferred, and will be normally within the range of about 1% to about 10% by weight. The additional oxide, or oxides, may be effectively incorporated with the alumina by adding a water-soluble salt of the component into the solution from which the alumina is precipitated. For example, titanium tetrachloride or zirconyl chloride may be added to the alumina sol prior to its dropping from the tips in the preparation of alumina spheres. However, the particular method employed for the manufacture of the alumina and other refractory material composited therewith is not considered an essential feature of the present invention. The catalyst may take the form of any desired shape such as spheres, pills, extrudates, powder, granules, cakes, etc. However, as hereinabove set forth, the preferred form of support is the sphere, and spheres of the carrier of this invention may be continuously manufactured by the well-known oil drop method, following the procedure described in U.S. Patent No. 2,620,314, issued to James Hoekstra. Regardless of the method of manufacturing the refractory oxide particles, such particles are generally subjected to specific aging treatments.

When the catalyst is to be used for the oxidation of exhaust gases containing vaporized or entrained lead or lead compounds such as result from the combustion of leaded gasolines, it has been found improved results are obtained if the catalyst base has an exceptionally low apparent bulk density of less than about 0.4 gram per cubic centimeter of catalyst, and more particularly an apparent bulk density within the range of about 0.15 to about 0.35 gram per cubic centimeter; it is believed that this special form of base, whose pore structure is characterized by a high percentage of macropores, is able to absorb quite substantial quantities of lead without obstructing or covering the active catalytic sites. Any catalyst formed of such low density carrier material may therefore be expected to have an unusually high lead stability. Such low apparent bulk density may be attained by controlled aging treatments after sphere formation, or by control of the aluminum to chloride ratio in the preparation of the alumina hydrosol prior to dropping and sphere formation. Generally, an aluminum to chloride weight ratio of above about 1.3, when forming the hydrosol, will result in the desired low density spheres. Attainment of low apparent bulk density is also facilitated by aging the freshly formed alumina spheres under sufficient pressure to maintain water in the liquid phase, and at a temperature in excess of about 210° F.

Improved results are also obtained if the alumina carrier material is made acidic since it appears that the catalyst then functions not only as an oxidizing catalyst but also as a cracking catalyst in the reduction of long-chain aliphatics and aromatics to more readily oxidizable hydrocarbons of lower molecular weight. An acidic oxide such as silica, titania or zirconia, compounded with the alumina as hereinabove set forth, normally imparts some acidic properties to the catalytic support. Thus, the carrier material of the instant invention may comprise a major proportion of alumina plus from about 0.5% to about 30% by weight of silica based on the carrier material; or a major portion of alumina plus about 0.1% to about 10% by weight of zirconia based on said carrier material. The incorporation of zirconia, particularly in amounts ranging from about 0.5% to about 5% by weight, appears to be beneficial in that it also increases the attrition resistance of the catalyst, a consideration of no little importance when it is realized that the catalyst may be subjected to severe bouncing and vibrational effects when used in mobile applications. In addition to compounding the alumina with an acidic oxide, acidic properties may also be obtained by combining a halogen or phosphorus with the support. Such halogen or phosphorus may be added in any suitable manner, either before or after incorporation of the catalytically active metallic component to the support. The addition of halogen is generally accomplished through the use of an acid such as hydrogen fluoride and/or hydrogen chloride, or volatile salts such as ammonium fluoride and/or ammonium chloride. The halogen may be incorporated into the alumina during the preparation of the latter, as where the refractory inorganic oxide is prepared from a halide-containing hydrosol. Such a method affords a convenient manner of compositing halogen while at the same time manufacturing the alumina. In still another method of manufacture, the halogen may be composited with the refractory oxide during the impregnation thereof with the catalytically active metallic components. Thus, where the low density alumina is prepared from an alumina hydrosol having an aluminum to chloride weight ratio in excess of 1.3, the use of such a method readily incorporates chloride where the latter is desired as the halogen. Fluoride is, however, the preferred halogen, as it is more resistant to removal by steam under the conditions of use of the catalyst. Phosphorus may be incorporated with the composite by the use of a phosphate or acid phosphate salt, or a phosphoric acid, suitably composited with the refractory carrier.

Apart from the particular refractory materials employed as a carrier for the metallic activating component, and regardless of the particular method selected for the preparation of such carrier, the catalytically active metallic component may be added thereto in any suitable, convenient manner. Where platinum is employed, by reason of its being a preferred activating component, it may be added to the carrier material by commingling the latter with an aqueous solution of chloroplatinic acid. Other water-soluble compounds of platinum, or of the other noble metal components, may be utilized in the impregnating solution, and include ammonium chloroplatinate, platinous chloride, platinic chloride, dinitrito-diaminoplatinum, etc. In the preparation of the several platinum-alumina catalyst fractions of varying platinum content, the weight percentage of platinum deposited as to each fraction can be readily controlled by properly adjusting the platinum concentration of the impregnating solution. Where the catalyst is to contain other metallic components, such as those hereinabove set forth, the catalyst may be prepared by commingling water-soluble compounds of these components, particularly the nitrates, sulfates, chlorates, chlorides or carbonates, and soaking the particles of the oxide therein followed by heating to form the corresponding oxides of the metallic components. Although the precise means by which the metallic component is combined with the refractory material is not known, it is believed that it exists in some physical association or chemical complex therewith. Thus, platinum may be present as such, or as a chemical compound, or in physical association with the refractory oxide, or with the other catalytically active metallic components, or in some combination with both.

The following examples are given for the sole purpose of further illustrating the method of the present invention, and to indicate the benefits afforded through the utilization thereof. It is not intended that the present invention be limited to the specific reagents, catalysts, concentrations and/or conditions employed in the examples.

EXAMPLE I

The ignition temperature of a catalyst sample is determined as follows: a 10 cubic centimeter bed of catalyst is placed in an electrically heated Vycor tube, through which is passed a mixture of carbon monoxide and air under substantially atmospheric pressure, the flow rates thereof being regulated at 200 cubic centimeters per minute of carbon monoxide and 4800 cubic centimeters per minute of air. Means are provided for measuring and recording the bed inlet and outlet temperatures. The Vycor tube is gradually increased in temperature by adjusting the electrical heat input thereto. So long as ignition does not occur, the bed inlet and outlet temperatures, although both increasing, remain equal. When the ignition temperature is reached, the outlet temperature will suddenly begin to rise at a more rapid rate than the inlet temperature until the combustion process lines out, whereupon the inlet and outlet temperatures will again continue to rise, assuming that additional heat is still being added to the system, but at equal rates; the point of divergence between inlet and outlet temperatures is then taken as the ignition temperature.

A catalyst, designated as "A," was prepared by the general method of dissolving aluminum pellets in hydrochloric acid to form a sol. The sol was then treated in a manner similar to the procedure set forth in U.S. Patent No. 2,620,314, involving the mixing of hexamethylenetetramine therewith and dropping into an oil bath maintained at about 190° F. to form spheres. The spheres were then aged in oil and then in an aqueous solution of ammonia, the ammonium hydroxide washed spheres being subsequently dried and calcined at a temperature of about 1200° F. The calcined alumina spheres were 1/8" in diameter and had an apparent bulk density of 0.27 gram per cubic centimeter.

A portion of these low density alumina spheres was soaked in a dilute solution of ammonium fluoride and the resulting soaked spheres were then subjected to a high temperature calcination of about 1000° F. for approximately a two hour period. This treatment provided an approximate 0.5% fluorine content to the alumina base material. Platinum was then combined with the base material by soaking the base in a dilute solution of chloroplatinic acid to provide a 0.1% platinum content complexed with the base. The platinum-impregnated spheres were then evaporated to dryness and subjected to reduction by being gradually heated up to about 1000° F., in the presence of hydrogen, and held at such temperature for about 2 hours.

The above procedure was repeated as to four other separate portions of the low density alumina base, except that different concentrations of chloroplatinic acid solution were employed with each of said portions to provide varying platinum contents therein, namely, 0.75%, 0.5%, 0.09%, and 0.05% by weight, respectively. A second catalyst, designated as "B," was then formulated by preparing a mechanical mixture of said four portions according to the following distribution:

| Wt. percent of catalyst B: | Wt. percent platinum |
|---|---|
| 1 | 0.75 |
| 7 | 0.5 |
| 28 | 0.09 |
| 64 | 0.05 |

It will be seen that the overall weight percent platinum of catalyst B, prepared according to the method of this invention, was the same as that of catalyst A, namely 0.1% Pt. Catalysts A and B were each subjected to the carbon monoxide oxidation test as described hereinabove, with the result that catalyst A showed an ignition temperature of 415° F. and catalyst B showed an ignition temperature of 390° F. It may thus be seen that the multiple-fraction platinum-alumina catalyst of varying platinum content provided a considerably lower ignition temperature than the conventional catalyst having a completely uniform distribution of platinum with respect to each spherical particle.

EXAMPLE II

A catalyst, designated as "C," is prepared by dissolving aluminum pellets in hydrochloric acid to form a sol. A zirconyl chloride solution is then added to the sol in an amount such that the resulting alumina contains about 1.5% zirconia, by weight of the alumina. The sol is then formed into spheres, aged in oil, and the resulting aged alumina-zirconia spheres are dried and calcined. The dried and calcined alumina-zirconia spheres are then impregnated with an ammonium fluoride solution and are thereafter calcined at 1200° F. for two hours to fix the fluorine content thereof at 0.5% by weight. The fluorided alumina-zirconia spheres are then soaked in a chloroplatinic acid solution, in a manner similar to that set forth in Example I, to provide a 0.1% platinum content in the composite. The platinum-impregnated spheres are then drained, evaporated to dryness, and reduced in hydrogen at a temperature of about 1000° F. for two hours.

The above procedure is repeated as to three other separate portions of the alumina-zirconia base, except that different concentrations of chloroplatinic acid solution are employed with each of said portions to provide varying platinum contents therein, namely, 1%, 0.20%, and 0.051% by weight, respectively. A second ctatalyst, designated as "D," is then formulated by preparing a mechanical mixture of said three portions according to the following distribution.

| Wt. percent of catalyst D: | Wt. percent platinum |
|---|---|
| 2 | 1 |
| 20 | 0.20 |
| 78 | 0.051 |

It will be seen that the overall weight percent platinum of catalyst D is the same of that of catalyst C, namely 0.1% platinum. Catalysts C and D are each subjected to the carbon monoxide oxidation test described in Example I, with the result that catalyst D shows an ignition temperature about 20° F. lower than the ignition temperature of catalyst C.

EXAMPLE III

A catalyst, designated as "E," is prepared as follows: a silica sol, formed by the acidification of water glass with hydrochloric acid, is commingled with an alumina sol formed by dissolving aluminum pellets in hydrochloric acid. The relative amounts of silica sol and alumina sol thus commingled are proportioned so as to provide a silica content in the resulting alumina-silica complex of about 2.0% silica. The alumina-silica complex is then formed into spheres, aged in oil and then in an aqueous solution of ammonia, with the aging treatment being followed by drying and calcination. The resulting calcined alumina-silica spheres are then soaked in a chloroplatinic acid solution, in a manner similar to that set forth in Example I, providing a 0.1% platinum content in the composite. The platinum-impregnated spheres are then drained and dried and subjected to reduction by hydrogen at 1000° F. for about two hours.

The above procedure is repeated as to four other separate portions of the alumina-silica base, except that different concentrations of chloroplatinic acid solution are employed with each of said portions to provide varying platinum contents therein, namely, 1%, 0.5%, 0.08%, and 0.05% by weight, respectively. A second catalyst, designated as "F," is then formulated by preparing a mechanical mixture of said four portions according to the following distribution:

| Wt. percent of catalyst F: | Wt. percent platinum |
|---|---|
| 1 | 1 |
| 7 | 0.5 |
| 28 | 0.08 |
| 64 | 0.05 |

It will be seen that the overall weight percent platinum of catalyst F is the same as that of catalyst E, namely 0.1% platinum. Catalysts E and F are each subjected to the carbon monoxide oxidation procedure described in Example I, with the result that catalyst F, prepared according to the method of the instant invention, shows an ignition temperature about 20° F. below that of conventionally prepared catalyst E.

EXAMPLE IV

Four catalysts comprising platinum impregnated on ⅛" alumina spheres containing 0.5% fluoride were prepared as described in Example I, these catalysts containing 2%, 0.3%, 0.1%, and 0.05% platinum by weight. Two otherwise identical beds of catalyst were prepared, one consisting solely of catalyst containing 0.1% Pt, and the other a mixture (G) of the four in the following proportions.

| Wt. percent of catalyst G: | Wt. percent platinum |
|---|---|
| 1 | 2 |
| 7 | 0.3 |
| 28 | 0.1 |
| 64 | 0.05 |

Catalyst G contained an average of 0.1% Pt, and was therefore comparable with catalyst A of Example I.

The beds of catalysts A and G, disposed in identical cylindrical steel containers equipped with air aspirators, were separately inserted in the exhaust of a 1958 Buick automobile and tested under various operating conditions. In one test, the automobile was run on a chassis dynamometer through a standard cycle including acceleration, low-speed cruise, further acceleration, high speed cruise, deceleration, and idle, the inlet and outlet gases from the catalyst bed being collected and analyzed for hydrocarbon and carbon monoxide content during each portion of the cycle, and the over-all weighted average conversions during the entire cycle being calculated. These weighted averages are given in the table below as those of "cyclic" operation. In another series of tests, the two catalyst beds were separately tested under steady idling, steady 30 m.p.h. cruise, and steady 60 m.p.h. cruise, the first two resulting in low inlet temperatures to the catalyst bed and the third in high inlet temperatures. In all cases a fuel containing 3 ml./gal. of tetraethyl lead fluid was used. The results obtained are shown below.

| | Percent Conversion | | | |
|---|---|---|---|---|
| Engine Operation | Catalyst A | | Catalyst G | |
| | Hydrocarbons | CO | Hydrocarbons | CO |
| Cyclic | 87 | 80 | 93 | 80 |
| Idle | 5 | 15 | 75 | 75 |
| 30 m.p.h. Cruise | 15 | 60 | 93 | 100 |
| 60 m.p.h. Cruise | 90 | 90 | 86 | 85 |

It will be seen that while catalysts A and G are nearly equivalent under high-temperature conditions, catalyst G is vastly superior at low-temperature conditions of idle and low-speed cruise.

It is clear that a substantial improvement is effected in the conversion of a combustible waste gas stream by contacting such stream under oxidation conditions, with a catalyst bed comprising a mechanical mixture of at least two portions of catalyst particles, a minor portion containing a relatively high percentage of platinum per particle, and a major portion containing a substantially lesser percentage of platinum per particle, the particles of higher platinum content being distributed substantially uniformly throughout the entire volume of the catalyst bed. The use of such multiple-fraction catalyst mixtures enables the oxidation of waste gases to proceed at a substantially lower temperature than is required with a catalyst wherein the platinum content of all of the catalyst particles is more or less equal as to each particle and to the average platinum content of the multi-fraction bed.

I claim as my invention:

1. A method for burning combustibles contained in a waste gas stream which comprises contacting said stream, in admixture with oxygen and at oxidation temperature, with a fixed bed of platinum-containing refractory oxide particles of substantially spherical shape and uniform size, about 8% to about 30% of said particles each having a relatively high platinum content not exceeding about 5% by weight of platinum per particle and the major portion of said particles each having a relatively low platinum content not exceeding about 0.1% by weight of platinum per particle, the platinum content of each high platinum particle being at least three times the platinum content of each low platinum particle, said particles of high platinum content being distributed substantially uniformly throughout the entire volume of said bed and each particle of relatively high platinum content being substantially surrounded by and in contact with a plurality of particles of relatively low platinum content, and said particles of relatively high and low platinum content being proportioned to provide in said bed an overall platinum content in the range of about 0.05% to about 0.2% by weight.

2. The method of claim 1 further characterized in that the refractory oxide component of said particles comprises a major proportion of alumina.

3. The method of claim 2 further characterized in that said refractory oxide component comprises from about 0.5% to about 30% by weight of silica.

4. The method of claim 1 further characterized in that said bed comprises a first minor portion of particles containing from about 0.75% to about 5% by weight of platinum per particle, a second intermediate portion containing from about 0.1% to about 0.75% by weight of platinum per particle, and a third major portion containing less than about 0.1% of platinum per particle.

5. The method of claim 1 further characterized in that said bed comprises a first minor portion of particles containing from about 0.75% to about 5% by weight of platinum per particle, a second portion embracing a greater number of particles than said first portion and containing from about 0.1% to about 0.75% by weight of platinum per particle, a third portion embracing a greater number of particles than said second portion and containing from about 0.075% to about 0.1% by weight of platinum per particle, and a fourth portion embracing the majority of particles of said bed and containing less than about 0.075% by weight of platinum per particle.

References Cited

UNITED STATES PATENTS

| | | | |
|---|---|---|---|
| 3,070,640 | 12/1963 | Pfeiffer et al. | 252—466 X |
| 2,071,119 | 2/1937 | Harger | 23—2 |
| 2,747,976 | 5/1956 | Houdry | 23—2 |
| 2,776,875 | 1/1957 | Houdry | 23—288 |

OTHER REFERENCES

Rideal and Taylor: "Catalysis in Theory and Practice," 2nd edit. (1926), p. 98 relied on.

EDWARD J. MEROS, *Primary Examiner.*

OSCAR R. VERTIZ, MILTON WEISSMAN, *Examiners.*

A. J. GREIF, *Assistant Examiner.*